United States Patent

[11] 3,598,309

[72] Inventors Charles H. Engler
 Murray Hill;
 Robert Fulvio, Secauscus, both of, N.J.
[21] Appl. No. 45,031
[22] Filed June 10, 1970
[45] Patented Aug. 10, 1971
[73] Assignee Engler Instrument Company
 Jersey City, N.J.

[54] HUBODOMETER WITH RESETTABLE SIGNAL
 10 Claims, 8 Drawing Figs.
[52] U.S. Cl. ..................................... 235/95 B,
 116/114 W, 235/96
[51] Int. Cl. ..................................... G01c 22/00,
 G01d 21/00
[50] Field of Search .......................... 235/95 B,
 95 R, 96, 1 A; 116/114 AE, 114 W; 40/41

[56] References Cited
 UNITED STATES PATENTS
| | | | | |
|---|---|---|---|---|
| 1,948,427 | 2/1934 | Moecker | | 40/41 |
| 2,130,613 | 9/1938 | Colee | | 116/114 W |
| 2,253,827 | 8/1941 | Vinton | | 116/114 W |
| 2,493,437 | 1/1950 | Berry | | 116/114 W |
| 2,589,623 | 3/1952 | Merritt et al. | | 116/114 WX |
| 2,601,838 | 7/1952 | Boates | | 116/114 WX |
| 2,638,274 | 5/1953 | Engler | | 235/95.3 |
| 3,539,783 | 11/1970 | Bergsma et al. | | 235/96 |

Primary Examiner—Richard B. Wilkinson
Assistant Examiner—Stanley A. Wal
Attorney—Harry B. Rook ABSTRACT: A closed casing adapted to be affixed to a rotatable element has a window and a registering mechanism inside the casing mounted to permit the casing to rotate around it having indicator wheels visible through said window, and drive means for said indicator wheels. A signal inside the casing is normally disposed in a first position and includes an element juxtaposed to said window and normally engaged with said drive means to move said signal in timed relation to the movement of said indicator wheels into a second signaling position. Said element is disengageable from said drive means by a force, for example, magnetism, applied externally of and through said window and is automatically reset to said normal first position.

INVENTORS
Charles H. Engler
Robert Fulvio
BY
Harry B. Cook
ATTORNEY

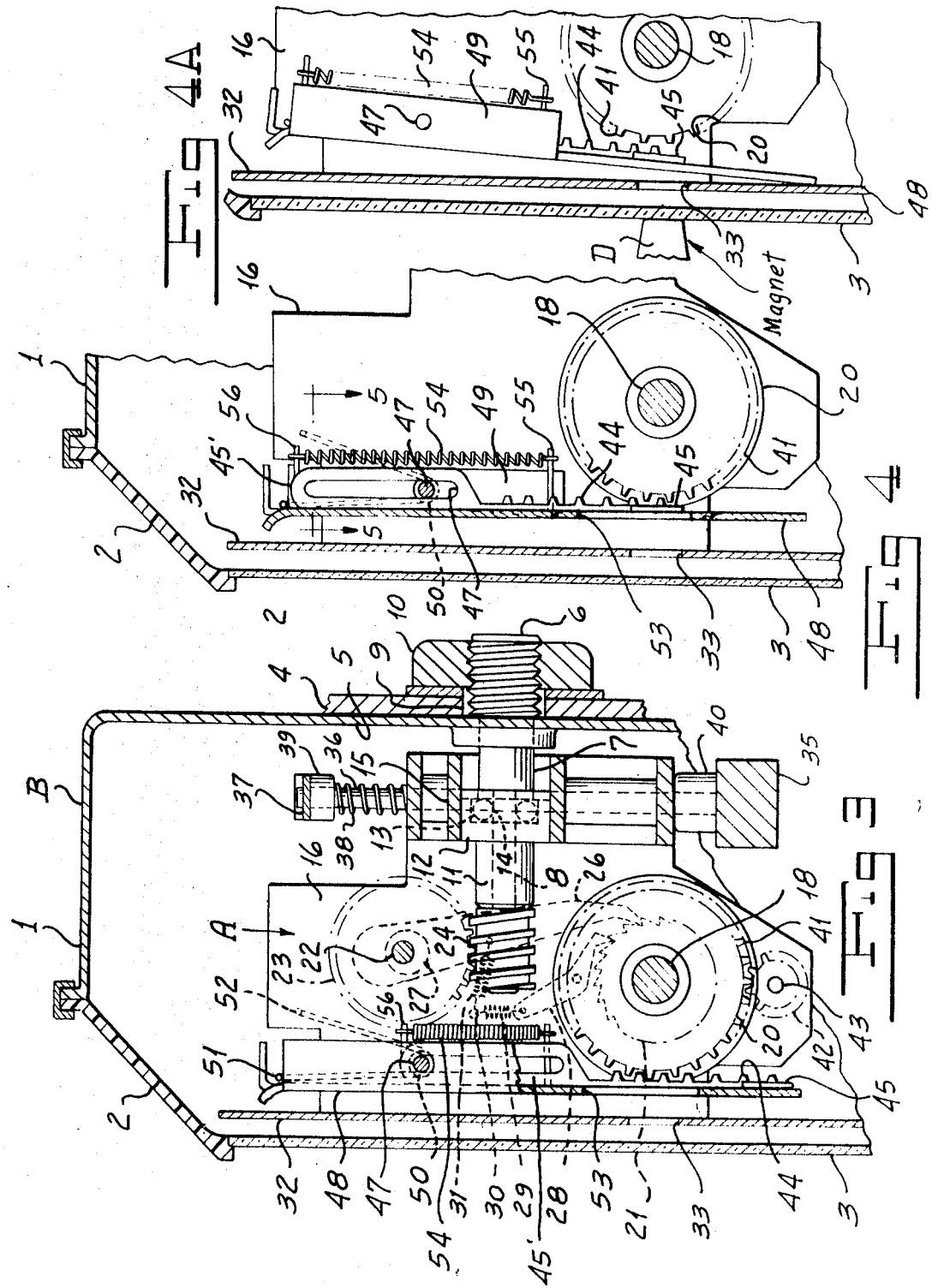

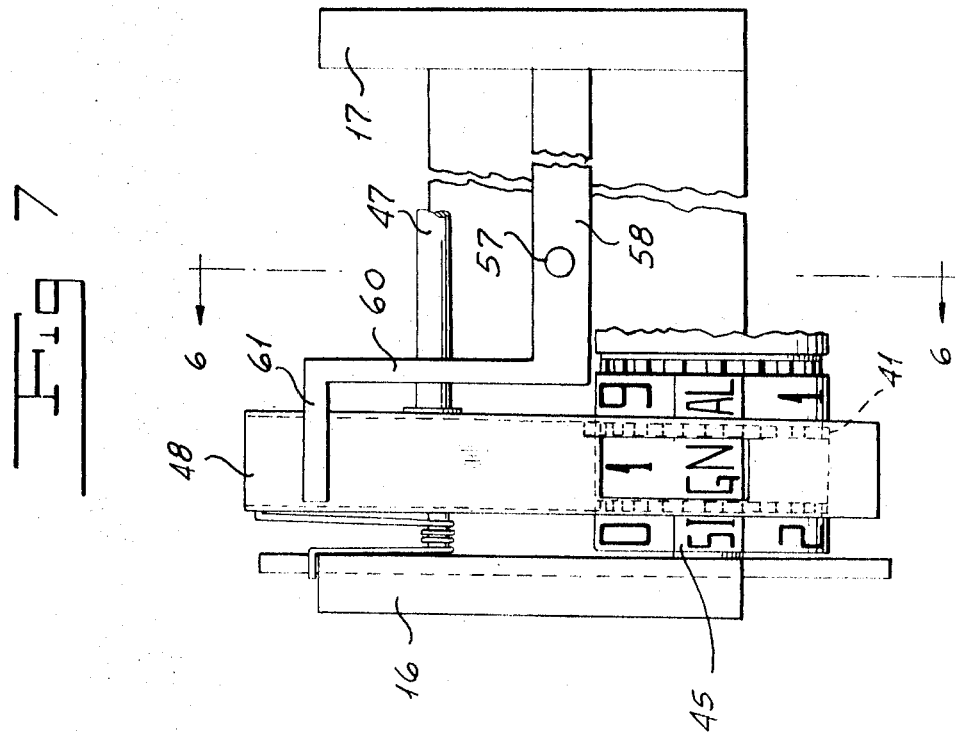
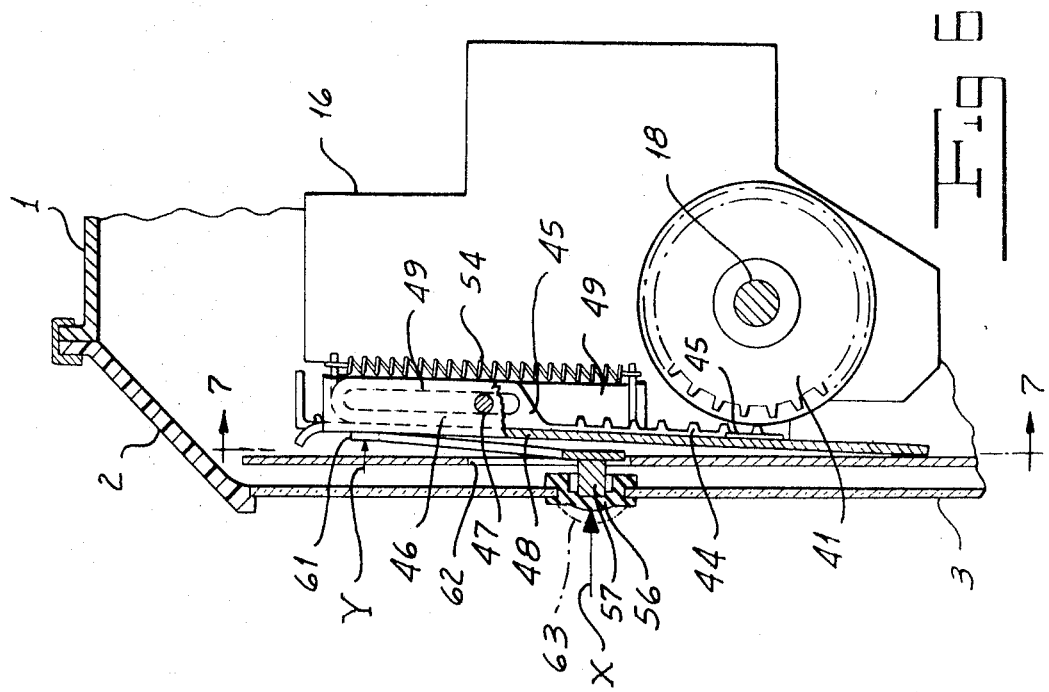

HUBODOMETER WITH RESETTABLE SIGNAL

BACKGROUND OF THE INVENTION

1. Field of the Invention

This invention relates to mechanisms for registering revolutions of a rotating member, for example, odometers, and more particularly the invention is directed to odometers of the so called "driveless" type designed to be mounted on the hubcap of a vehicle wheel.

The invention is also concerned with an odometer having a signaling device adapted to be operated upon completion of a predetermined number of revolutions of the rotating member for directing the attention of the operator to some requirement, for example, the change of the oil in an automobile motor.

2. Description of the Prior Art

So-called hubodometers are known, for example in U.S. Pat. Nos. 2,638,274 and No. 1,010,654, and odometers having signaling devices also have been proposed as shown by U.S. Pats. No. 1,891,335 and No. 1,872,838. However, so far as I know, there has never been an odometer of the so-called "driveless" type that has a signal associated therewith.

SUMMARY

A primary object of the invention is to provide an odometer of the "driveless" type, with a signaling device, and ore particularly the invention contemplates such an odometer wherein the signaling device is resettable.

In odometers of this type the registering mechanism is pendulously mounted in the casing and the casing is rotatable relatively to and around the registering mechanism, and therefore it has been thought to be unfeasible to provide a resetting shaft or knob for the signal operable from the outside the causing because such a shaft or knob would have to be mounted in the casing and would therefore rotate relatively to and around the registering mechanism and any signal inside the casing. It is therefore another object of the invention to apply to the signal a force, for example, magnetism, externally of and through a wall of the casing to initiate resetting of the signal.

Instead of applying a magnetic force to the signal, a pushbutton inside the casing may be actuated by pressure applied from outside the casing against a resilient diaphragm sealed in the wall of the casing on the axis of rotation.

A further object of the invention is to provide a signal including an element, such as a gear rack, mounted on the registering mechanism frame and movable into and out of engagement with the gear of one of the indicating wheels.

BRIEF DESCRIPTION OF THE DRAWINGS

For a more complete understanding of the invention, reference may be had to the following description in conjunction with the accompanying drawings in which:

FIG. 3 is an enlarged fragmentary vertical sectional view approximately on the plane of the line 3-3 of FIG. 1;

FIG. 4 is a similar view with parts omitted and showing in solid lines the signal in the operative signaling position illustrated in FIG. 2;

FIG. 4a is a similar view showing the manipulation of the signal b a magnet to disengage the motion transmitting member from the drive means preliminary to the normal inoperative position shown in FIGS. 1 and 3;

FIG. 6 is a fragmentary vertical sectional view similar to FIG. 4a taken approximately on the plane of the line 6-6 of FIG. 7 and illustrating a modification of the means for disengaging the motion transmitting member from the drive means and showing said means in operation to cause disengagement of the motion transmitting member;

FIG. 7 is a fragmentary elevational view approximately on the plane of the line 7-7 of FIG. 6 showing the signal in operative signaling position.

BRIEF DESCRIPTION OF THE PREFERRED EMBODIMENTS

Figure 1:
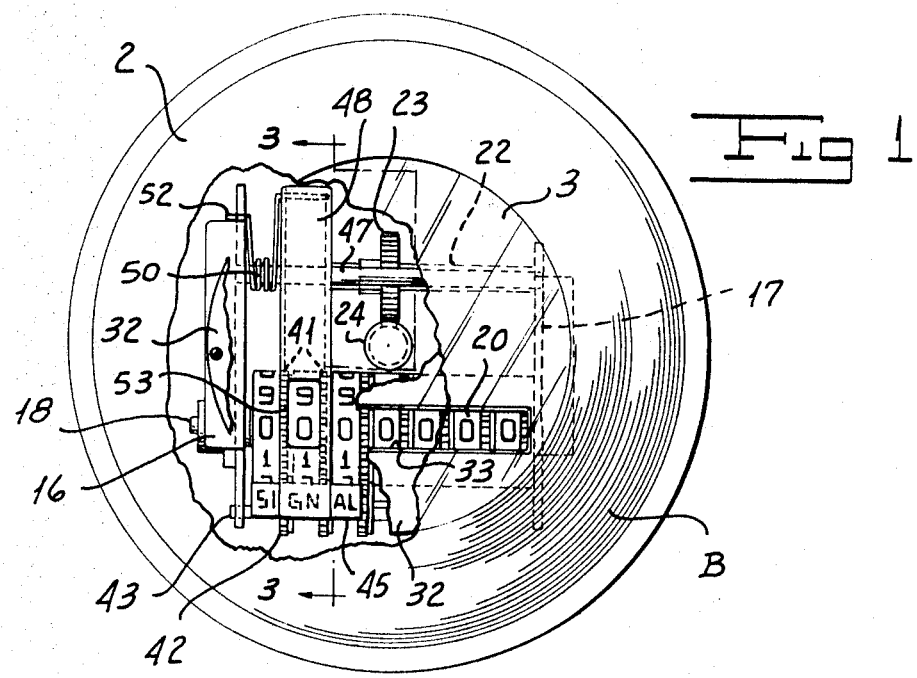
FIG. 1 is a front view of a hubodometer embodying the invention, parts being broken away, showing the signal in normal invisible position.

For the purpose of illustrating the principles of the invention, we have shown it in connection with a well-known type of hubodometer of the "driveless" type, one example of which is the hubodometer shown in Pat. No. 2,638,274.

The registering mechanism A is enclosed in a casing B which is adapted to be mounted on a rotating member such as a hubcap of a vehicle as illustrated, for example in said patent. The casing includes a cup-shaped body 1 and dome-shaped cover 2 secured to the front end thereof so that the casing is closed to minimize the possibility of dirt, grease and moisture getting into the interior of the casing. The cover which constitutes the front wall of the casing has a transparent portion 3 which serves as a window through which the registering mechanism is visible.

The rear wall 5 of the casing has a central opening through which the drive shaft of the registering mechanism A extends. The shaft is formed with a rear externally projecting and screw-threaded end portion 6, another externally screw-threaded portion 7 of smaller diameter, and a nonthreaded portion 8 of smaller diameter. The intermediate portion 7 of the shaft is threaded in and extends through the wall 5 so that the portion 8 is disposed in the casing, coaxially therewith and the rearwardly projecting portion 6 extends through an opening 9 in the front wall 4 of the hubcap or other rotating member, and a nut 10 demountably fastens the casing to the hubcap.

A sleeve member 11 is rotatably mounted on the nonthreaded portion 8 of the drive shaft and has at its inner end an enlarged portion 12 forming a shoulder and having a countersunk portion 13 of its inner face with which shoulder at the end of the inner portion 7 of the drive shaft forms a raceway for ball bearings 14 to permit the casing to move around the registering mechanism A with slight friction. The sleeve member 11 is rigidly mounted in the rear bearing support 15 of the registering mechanism frame which also includes end plates 16 and 17 rigidly secured to the ends of the bearing support. The end plates provide bearing for shaft 18. A numeral or indicator wheel set made up of a series of connected number wheels 20 is loosely mounted upon the shaft 18 and includes in its organization a one-way counter drive ratchet 21 abutting against the outer face of the end plate 16.

A secondary drive shaft 22 is provided with a worm gear 23 of relatively large diameter so as to attain the necessary gear reduction and is centered on the shaft 22 so as to bring the same in line with the diameter passing through the axis of the casing. A worm 24 is fastened to the main drive shaft portion 8 adjacent its inner end and meshes with the worm gear 23. It will be understood that the tooth relation between this worm and worm gear establishes the reduction ratio between the drive shaft 8 and the secondary drive shaft 22.

An elongated feeding pawl 26 is loosely mounted at one end on the protruding end of shaft 22, and fastened on the outer end of said shaft is a camming disk 27 rotatably mounted in an opening in the mounted end of the pawl whereby the pawl is oscillated at intervals as shaft 22 rotates. The other end of the pawl extends to a point adjacent the ratchet wheel 21 at the outer end of the shaft 18, and is bent to one side of the line of thrust of the pawl to provide a finger to engage successive teeth of the ratchet wheel 21 in a clockwise direction as viewed in FIG. 3 with a step-by-step motion.

The ratchet wheel actuates the indicator wheels 20 on the shaft 18 in succession. These indicator wheels form parts of a known type of odometer, the lower order wheel being actuated directly by the ratchet wheel, and suitable transfer mechanism being provided between the lower and higher order wheels, such as the well-known Geneva gearing, whereby the higher order numeral wheels register a predetermined number of rotations of the lower order numeral wheels. Instead of numerals on the indicator wheels other indicia could be utilized, depending upon the value or condition to be registered.

A locking pawl 28 is pivotally mounted on the end plate 16 and positioned above the axis of rotation of the ratchet wheel 21. The pawl 28 has a finger for engaging the teeth of the ratchet wheel to prevent reverse movement thereof during the dwell of the feeding pawl 26. A short tension spring 29 is secured to one end of the locking pawl and has its other end connected to a stud 30 on the end plate.

Another tension spring 31 has one end secured to the stud 30 and its other end connected to the feeding pawl 26. These springs 29 and 31 hold the ratchet engaging ends of the lock and feeding pawls, respectively, in resilient engagement with the teeth of the ratchet wheel.

A face plate 32 is secured to the outer edges of the end plates 16 and 17 and conceals the register mechanism from the front. The plate however is provided with the usual form of sight opening 33 positioned opposite the indicator wheel set so that the numerals on the wheels can be visible from the outside of the casing. Plate 32 is positioned between the window 3 of the casing and the registering mechanism and usually bears indicia so as to serve as a name plate.

To hold the registering mechanism against rotation about the shaft 8, there is a counterweight 35 mounted on two rods 36 which are vertically slidable in the bearing support 15 and connected at their upper ends by a tie bar 37. The counterweight is normally resiliently supported by springs 38 encircling the rods whose lower ends abut the bearing support 15 and between whose upper ends and the tie bar are rubber bumper blocks 39 to cushion the downward movements of the counterweight incident to travel by the vehicle carrying the hubodometer over the roadway bumps. Other rubber bumpers 40 on the rods between the bearing support and the counterweight cushion the upward movements of the latter.

In accordance with the invention there is provided a signaling device normally in a first nonsignaling position and including a motion-transmitting member normally in driving engagement with the odometer drive means for moving the signal in timed relation to the movement indicator wheels into a second signaling position. In the present embodiment, the indicator wheels 20 bear numerals indicating miles and each indicator wheel has a spur gear 41, and with the spur gears mesh pinions 42 mounted on a shaft 43 in the frame and constituting a part of the transfer mechanism of the drive means. The motion-transmitting member meshes with the gear 41 on the indicator wheel representing ten thousands of miles on the odometer and said member moves longitudinally upward from its nonsignaling position with every tenth of a rotation of the gear and travels a total of two-tenths of a complete rotation; at this point the odometer indicates the passage of 20,000 miles from its initial reading, and the motion-transmitting member moves the signal into a position to partially cover the portion of the mileage reading that is exposed through the sight opening 33.

Figure 5:
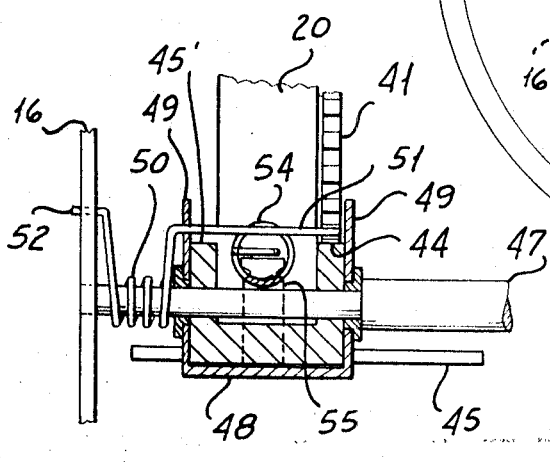
FIG. 5 is a view similar to FIG. 4 showing a modified means for manipulation the signal to disengage the motion transmitting member from the drive means.

More specifically, the motion-transmitting member constitutes a gear rack 44 that has a "flag" or signal at its lower end which is formed by a portion of the rack bar and two winglike extensions 45, one at each side of the rack bar. The upper end of the rack bar has horizontally spaced flanges 45' that extend longitudinally of the bar and have slots 46 through which extends a pivot rod 47 the ends of which are secured in the end plates 16 and 17 of the frame. The rack bar is supported by a guide support 48 which also has spaced-apart flanges 49 one at each side of the rack bar and both pivotally mounted on the rod (FIGS. 3 and 5). The guide support is normally tilted on the pivot rod 47 so that the teeth of the gear rack are held in mesh with the teeth of the spur gear 41 as shown in FIG. 3, and with the flag or signal in its first nonsignaling position, invisible behind the name plate 32 and below the sight opening 33, as best shown in FIGS. 1 and 3. The guide support and rack bar are biased into this position by a helical torsion/spring 50 mounted on the pivot rod 47 with one end 51 abutting the guide support and the other end 52 connected to the end plate 16 of the frame.

Figure 2:
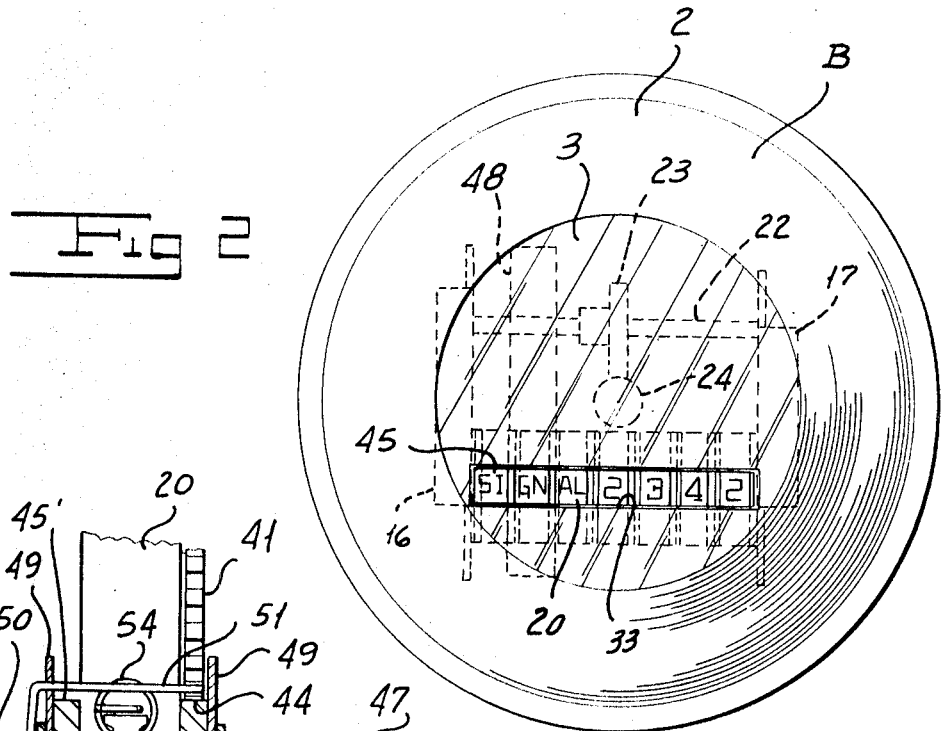
FIG. 2 is a front view of the hubodometer showing the signal in operative signaling position.

During the operation of the hubodometer, upon rotation of the spur gear 41 with which the gear rack meshes, the signal is moved to predetermined position; for example, when the odometer indicates the passage of 20,000 miles from its initial reading, the rack bar is moved from its nonsignaling position of FIGS. 1 and 3 to its signaling position shown in FIGS. 2 and 4 where the signal overlies or obscures the numerals on the three indicator wheels bearing the higher numerals. It should be pointed out that the guide support has an elongated opening 53 above the signal and through which the indicator wheel that is engaged by the gear rack and the flange are visible as shown in FIGS. 1,2 and 4. FIG. 1 shows the numeral of the indicator wheel exposed trough said opening while FIGS. 2,3 and 4 show a portion of the signal or "flag" through the opening.

In accordance with the invention, novel and improved means are provided to reset or restore the signal to its normal nonsignaling position. In the form of the invention shown in FIGS. 1 through 4, a portion of the signal or motion-transmitting member is formed of magnetic material which will respond to a magnetic force applied externally of and through the casing wall. For example, the signal itself may be formed of iron, or a portion of the guide support could be formed of a magnetic material so that when a permanent magnet denoted by reference character D is moved into juxtaposition to the window 3 and opposite the magnetic portion of the signal or guide support, as shown in FIG. 4a, the guide support and signal will be pulled toward the magnet so as to disengage the teeth of the gear rack from the teeth of the spur gear 41. Then the motion-transmitting member and signal are pulled downwardly by a tension spring 54 as shown in FIG. 3, and the spring 50 will tilt or swing the guide support and the gear rack into a normal position with the teeth of the gear rack meshing with the teeth of the spur gear as shown in FIG. 3. The signal is then ready for a repetition of its signaling operation upon rotation of the spur gear 41 which the rack is in engagement. It will be seen that one end of the spring 54 is connected by a pin 55 to the guide support while the other end of the motion-transmitting member.

Another way of resetting the signal is shown in FIGS. 6 and 7 where a flexible diaphragm 56 extends through and is sealed in the window 3 and abuttingly engages a pushbutton 57 carried by a spring presser strip 58 that has one end rigidly connected to the end plate 17 of the frame and is provided at its other end with a vertical arm 60 from which extends horizontally a finger 61 which abuts the upper end of the support guide above the pivot rod 47. The diaphragm and pushbutton are coaxial with the casing and the support shaft 18, and the name plate preferably has an opening 62 to provide clearance for the pushbutton and a portion of the spring strip 58. Normally the spring strip 58 causes the finger 61 only to lightly engage the support guide so that the gear rack is held by spring 50 (FIG. 5) in engagement with the spur gear, and the diaphragm 56 normally expands as indicated by dot and dash line 63 (FIG. 6) to permit the spring strip and the presser finger 61 to assume that normal position. When it is desired to disengage the rack bar from the gear, the diaphragm is manually pushed as indicated by the heavy arrow X in FIG. 6 so that through the pushbutton and strip 58 the finger 61 exerts pressure on the guide support as shown by the smaller arrow Y in FIG. 6 whereby the lower end of the guide support and gear rack are tilted away from the spur gear 41. After the diaphragm and gear rack have been manually actuated into the position shown in FIG. 6, the spring 54 returns the gear rack to its normal position and the spring strip 58 springs outwardly toward the window so that the pushbutton expands the diaphragm into its normal position indicated by the dot and dash line 63. The diaphragm keeps the casing sealed and yet permits the motion-transmitting element (gear rack) to be disengaged from the drive means by force applied externally of and through the window, and also permits the casing carried by the vehicle wheel hub to rotate around the registering mechanism which remains relatively stationary on the shaft 18.

The two embodiments of the invention have been shown and described to explain the principles of invention, but those skilled in the art will understand that modifications and changes can be made in the construction of the device within the spirit of the invention and the scope of the appended claims.

I claim:

1. An odometer of the "driveless" type comprising:
   a closed casing adapted to be affixed to a rotatable element and having a wall with a window;
   a registering mechanism inside the casing including a frame mounted to permit the casing to rotate around it and having indicator wheels visible through said window;
   drive means for said indicator wheels;
   a signal means inside said casing and normally in a first position;
   said signal means including a motion-transmitting member juxtaposed to said window and normally in driving engagement with said drive means to move said signal means in timed relation to the movement of said indicator wheels into a second position;
   said member selectively being movably disengageable from said drive means for return of said signal means to said first position;
   means to move the member out of engagement with said drive means; and
   means for actuating said motion-transmitting member to return said signal means to said normal first position.

2. An odometer as defined in claim 1 wherein said motion-transmitting member has a magnetic portion, and there is a magnet manually manipulatable outside said casing wall to magnetically attract said magnetic portion of said member and move said member out of engagement with said drive means.

3. An odometer as defined in claim 1 wherein said drive means includes a gear on one of said indicator wheels and said motion-transmitting member is a gear rack mounted to longitudinally slide on said frame and to pivot in opposite directions into and out of mesh with said gear.

4. An odometer as defined in claim 3 wherein said rack has a magnetic portion located to magnetically respond to magnet held in juxtaposition thereto outside said casing wall for moving said rack out of engagement with said gear.

5. An odometer as defined in claim 1 wherein the means for moving the motion-transmitting member out of engagement with said drive means includes a resilient diaphragm sealed in said casing wall on the axis of rotation of said casing to receive manual pressure applied externally of the casing, and means in the casing movably responsive to such pressure to actuate said motion transmitting member out of engagement with said drive means.

6. An odometer of the "driveless" type comprising:
   a closed casing adapted to be affixed to a rotatable element and having a wall with a window;
   a registering mechanism inside the casing including a frame mounted to permit the casing to rotate around it and having indicator wheels visible through said window;
   drive means for said indicator wheels;
   a signal means inside said casing and normally in a first position;
   said signal means including a motion-transmitting member juxtaposed to said window and normally in driving engagement with said drive means to move said signal means in timed relation to the movement of said indicator wheels into a second position;
   said member selectively being movably disengageable from said drive means for return of said signal means to said first position and means for actuating said motion-transmitting member to return the signal means to said manual first position.

7. An odometer as defined in claim 6 wherein said member has a magnetic portion located to respond to a magnet held in juxtaposition thereto outside said casing wall for moving said member out of engagement with said drive means.

8. An odometer as defined in claim 6 wherein said motion-transmitting member is pivotally mounted on said frame to swing into and out of engagement with said drive means.

9. An odometer as defined in claim 8 wherein there is means to move said member out of engagement with said drive means comprising a flexible diaphragm sealed in said casing wall on the axis of rotation of the casing, and means in the casing movably responsive to pressure applied to said diaphragm externally of the casing to apply said pressure to said motion-transmitting member to move the latter out of engagement with said drive means.

10. An odometer as defined in claim 9 wherein the last-named means includes an elongated spring having one end rigidly connected to said frame and its other end contacting said motion-transmitting member between one end thereof and the pivotal mounting thereof said spring having an intermediate portion engageable by said diaphragm when pressure is applied to the diaphragm.